(No Model.)

F. R. BOSTWICK.
HAME FASTENER.

No. 434,499.  Patented Aug. 19, 1890.

Witnesses
J. Jessen
J. W. Roberts

Inventor
Frederick R. Bostwick
By Paul Havemann Attys.

UNITED STATES PATENT OFFICE.

FREDERICK R. BOSTWICK, OF MINNEAPOLIS, MINNESOTA.

HAME-FASTENER.

SPECIFICATION forming part of Letters Patent No. 434,499, dated August 19, 1890.

Application filed January 2, 1890. Serial No. 335,582. (No model.)

*To all whom it may concern:*

Be it known that I, FREDERICK R. BOSTWICK, of Minneapolis, in the county of Hennepin and State of Minnesota, have invented certain Improvements in Hame-Fasteners, of which the following is a specification.

My invention relates to means for securing hames in their proper place on a collar and at the same time providing an attachment to which may be secured a holdback-strap or similar attachment.

Figure 1:
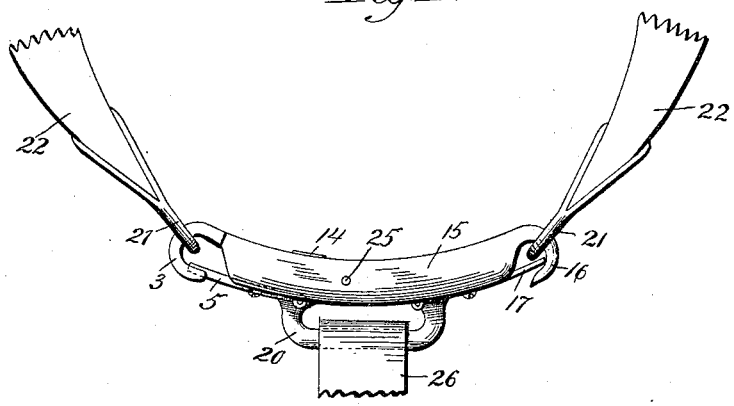
Figure 2:
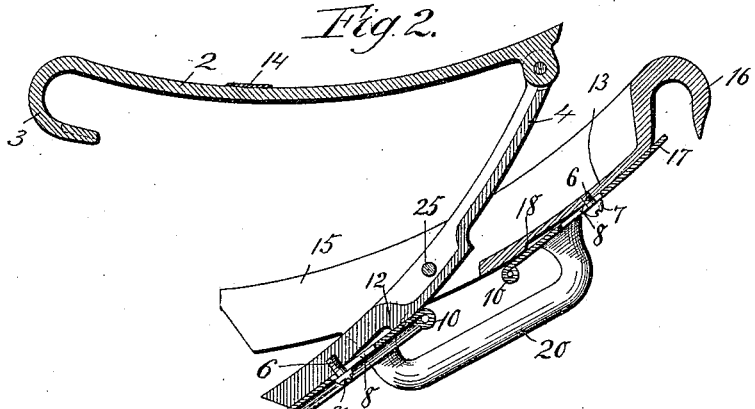
Figure 3:
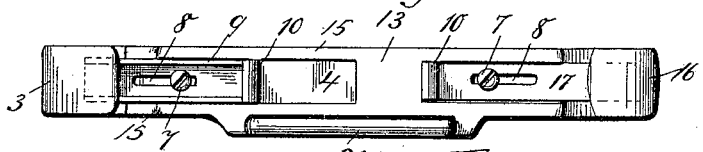
Figure 4:
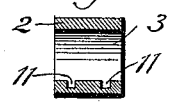
Figure 5:
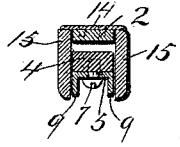

In the accompanying drawings, forming a part of this specification, Figure 1 is a front elevation of my improved hame-fastener and a portion of the hames. Fig. 2 shows the fastener detached and in section. Fig. 3 is a plan view looking from below. Figs. 4 and 5 are details of the spring-locks.

In the drawings, 2 represents a curved bar of any suitable material, having a hook 3 at one end, the other end being pivotally secured to a bar 4, similarly curved to fold against said bar 2 and within the hook 3. The loose end of the bar 4 is provided with a groove, in which the sliding lock-bar 5 is secured by means of the screw 6, having an enlarged head 7, said screw passing through a slot 8 in the lock-bar 5 and into the bar 4. The sliding lock-bar 5 has its outer edges turned up, forming flanges or ribs 9, the end being turned over upon itself to form a suitable finger-hold 10. In the hook 3 on its inner side are cut grooves 11, adapted to receive the flanges 9 of the sliding lock-bar 5. The bar 4 is further provided with a shoulder 12, adapted to form an obstruction to the withdrawal of the lock-bar 5 when in engagement with the grooved hook 3, requiring it to be slightly sprung away from the bar 4, to be passed over said shoulder 12, when it can readily be withdrawn. The case-bar 13 is provided and preferably pivoted to the bar 4 near its center by a stationary bolt or pivot 25, holding the parts firmly in one position, and is adapted to close over the sides of the bars 2 and 4, forming a casing therefor. A plate 14, secured to the upper part of the bar 2, forms a stop to its upward movement, the flanges 15 of the bar 13 striking against the projecting ends of said plate 14. The bar 13 is provided at its outer end with a hook 16 and a lock-bar 17, secured to the bar 13 in the same manner that lock-bar 5 is secured to bar 4, and sliding in a groove in said bar 13, similar to the one in bar 4, and adapted to close the opening of the hook 16. A shoulder 18 is provided as an obstruction to the withdrawal of the bar 17. A loop 20, constructed integrally with the case-bar 13, is preferably provided, of such form as to readily permit the securing of a strap 26, or a ring through it suitable for a pole strap or chain, the other end of which may be secured to the wagon-pole or neck-yoke, or a martingale or any other strap may be secured to said loop or ring.

The operation of the device is as follows: The hooks 3 and 16 are inserted into the eyes 21, secured to the hames 22. The bars 2, 4, and 13 are then pressed together by the hand so that they close one upon the other, the lower or incasing bar 13 covering the sides of the others and drawing the hames together into close engagement with the collar. The sliding bars 5 and 17 are then pressed outwardly, closing the openings of the hooks 3 and 16, the bar 5 fitting in the grooves 11, thereby locking the fastener in position. By having the loop 20 constructed as a part of the fastener the support of the pole-strap is metal and always in the proper position, not allowing the pole-strap to be shifted from side to side, sometimes getting around so far as to form a bearing between the collar and the shoulder of the animal, as is often the case where the pole-strap is secured around the collar. The parts being inclosed and forming a close fit with one another, snow and water are excluded. The sliding lock-bars hold the fastener always in position.

I claim as my invention—

1. In a hame-fastener, the combination, with the bar 4, of the bars 2 and 13, provided with the hooks 3 and 16, and pivotally secured to the bar 4, the bars 4 and 13 being provided with grooves at their outer ends terminating in the shoulders 12 and 14, the sliding lock-bars 5 and 17, secured to said bars 4 and 13, and the loops 20 formed on said bar 13, substantially as described, and for the purpose specified.

2. In a hame-fastener, the combination, with the bar 4, of the bars 2 and 13, provided with the hooks 3 and 16, and pivotally secured to the bar 4 by the stationary pivot 25, said bars 4 and 13 being provided with grooves at their outer ends terminating in shoulders 12 and 14, and the sliding spring lock-bars 5 and 17, secured to said bars 4 and 13, substantially as described.

In testimony whereof I have hereunto set my hand this 26th day of December, 1889.

FREDERICK R. BOSTWICK.

In presence of:
A. C. PAUL,
A. M. GASKILL.